United States Patent [19]

Goldstaub et al.

[11] 3,995,592
[45] Dec. 7, 1976

[54] PIGLET WEANING

[75] Inventors: Henry Herbert Goldstaub, Buckhurst Hill; James Nathaniel Morris, Loughton, both of England

[73] Assignee: Electrothermal Engineering Limited, London, England

[22] Filed: Apr. 23, 1975

[21] Appl. No.: 570,847

[30] Foreign Application Priority Data

Apr. 26, 1974   United Kingdom ............ 18499/74

[52] U.S. Cl. .................................. 119/16; 119/20; 119/33

[51] Int. Cl.² ........................................ A01K 1/00

[58] Field of Search .................. 119/20, 16, 33, 28, 119/37

[56] References Cited
UNITED STATES PATENTS

| | | | |
|---|---|---|---|
| 2,280,779 | 4/1942 | Barragy | 119/16 X |
| 2,493,589 | 1/1950 | McCaskell | 119/33 X |
| 2,732,826 | 1/1956 | Dawson | 119/20 |
| 2,851,992 | 9/1958 | Wolf | 119/33 |
| 3,181,503 | 5/1965 | Tripp | 119/20 |
| 3,299,253 | 1/1967 | Lawson, Jr. | 119/16 X |
| 3,472,206 | 10/1969 | Hegland et al. | 119/20 |
| 3,724,424 | 4/1973 | Benjamin | 119/16 |

*Primary Examiner*—J.N. Eskovitz
*Attorney, Agent, or Firm*—Finnegan, Henderson, Farabow & Garrett

[57] ABSTRACT

There are disclosed housings for use in weaning piglets including walls, a roof and, at the bottom of the housing, an electrical heater lying flat underneath a surface providing at least a part of a floor for the housing. In one of the examples, the heater is a heater which is electrically insulated to form a panel-shaped structure lying flat on a base of the housing, an upper surface of the structure providing at least part of a floor for the housing. In another example, the housing comprises a box, moulded to form in one piece the said walls and floor, and a lid for the box, to form the said roof, the heater being encapsulated in the floor.

1 Claim, 8 Drawing Figures

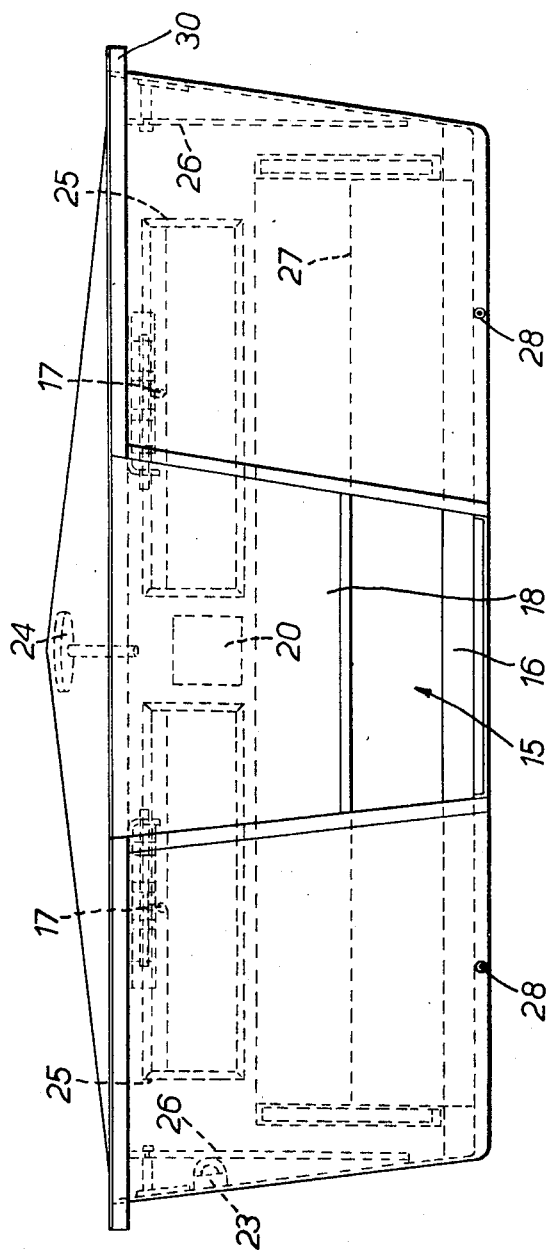

PIGLET WEANING

BACKGROUND OF THE INVENTION

This invention relates to housings for use in weaning piglets. It is known to effect early weaning of piglets in heated roofed pens. For example, a gas-fired thermostatically controlled recirculation-type warm-air unit may be installed in each pen. There is then the need of a fan in each pen to distribute evenly the warm air. Alternatively, a large centrally-located gas or oil-fired warm-air unit can be used to supply warm air to all pens. Such a system is expensive to install because it requires trunking to distribute the air and an elaborate control system to regulate the flow.

THE INVENTION

It is an object of this invention to provide a housing for use in weaning piglets which is of simpler and more efficient construction than known heated roofed pens.

According to this invention there is provided a housing adapted for use in weaning piglets, the housing comprising:

a. a box, molded to form in one piece walls and a floor for the housing,
b. a lid for the box to form a roof for the housing, and
c. a flat electrical heater encapsulated in the said floor.

The box could be molded from glass fiber-reinforced plastics material, as could the lid.

One of the said walls of the box could define an opening in it so that a piglet can enter or leave the housing, the opening having means for at least partially closing it.

The lid could be provided with means for holding it open in one or more positions.

The invention will now be described, by way of example, with reference to the accompanying drawings, in which:

FIG. 8 is a front view of it.

Figure 1:
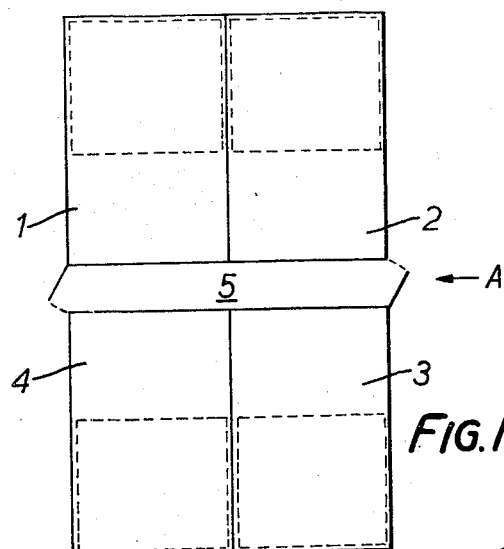
FIG. 1 is a plan view of the interior of a weaner house for piglets.

In plan view, the interior of a simple weaner house has, referring to FIG. 1, four pens 1 to 4 each about 12 feet by 8 feet, pens 1 and 2 being on opposite sides of a passageway 5 to pens 3 and 4. The pens 1 to 4 have a roof 6 shown in side view in FIG. 2, this figure being drawn looking in the direction of arrow A in FIG. 1. The roof 6 has a ventilation cowl 7 so that air can flow in the directions of the arrows in FIG. 2.

Figure 3:
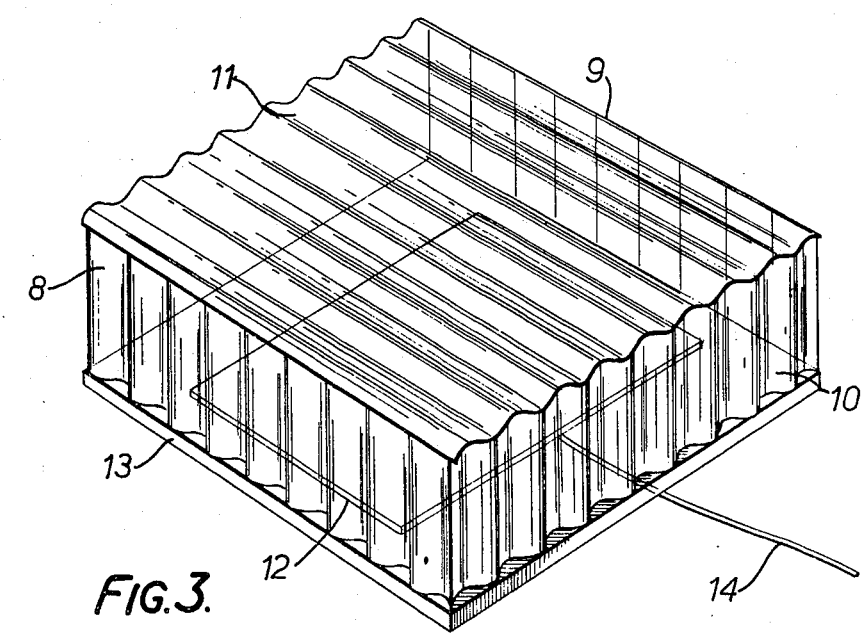
FIG. 3 is a perspective view of a housing, not in accordance with the invention, for keeping piglets warm, each pen of the weaner house having such a housing in it.
Figure 4:
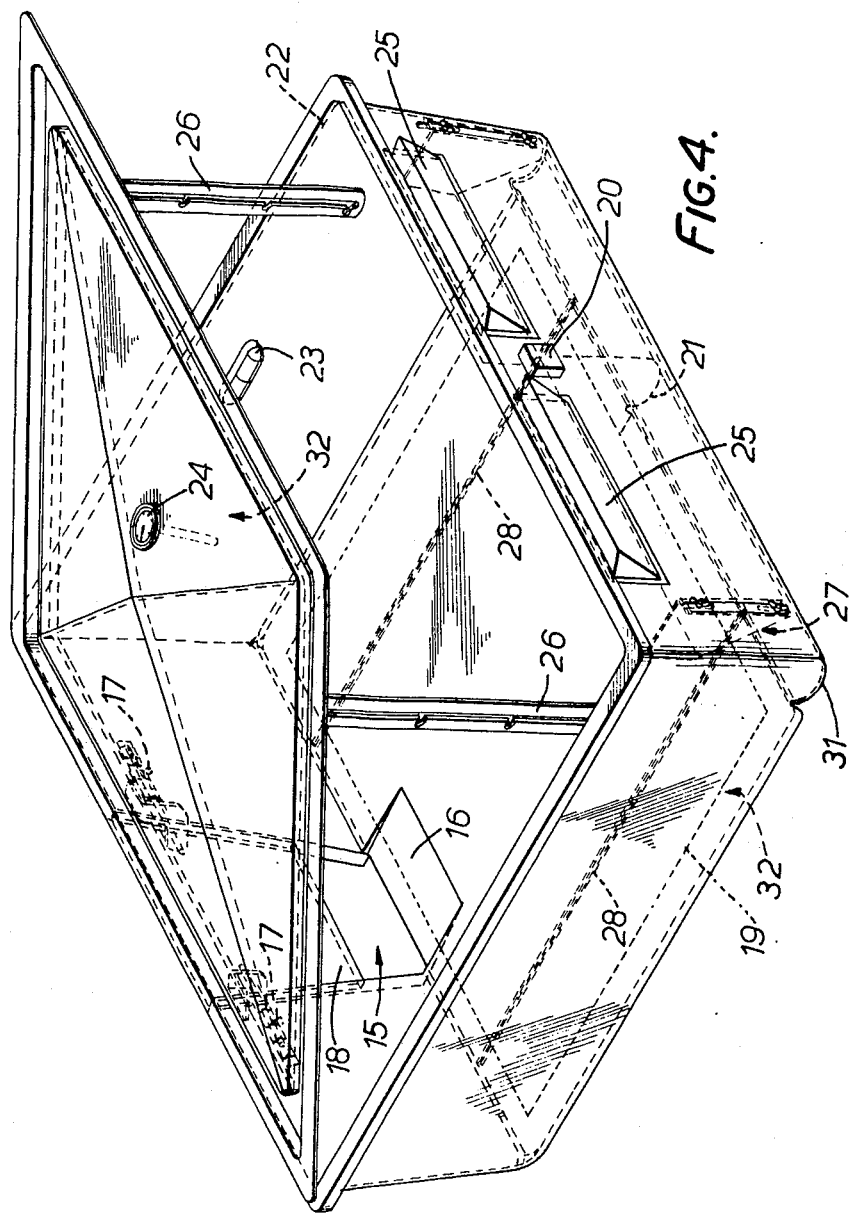
FIG. 4 is a perspective view from the rear of an example of a housing according to the invention.
Figure 5:
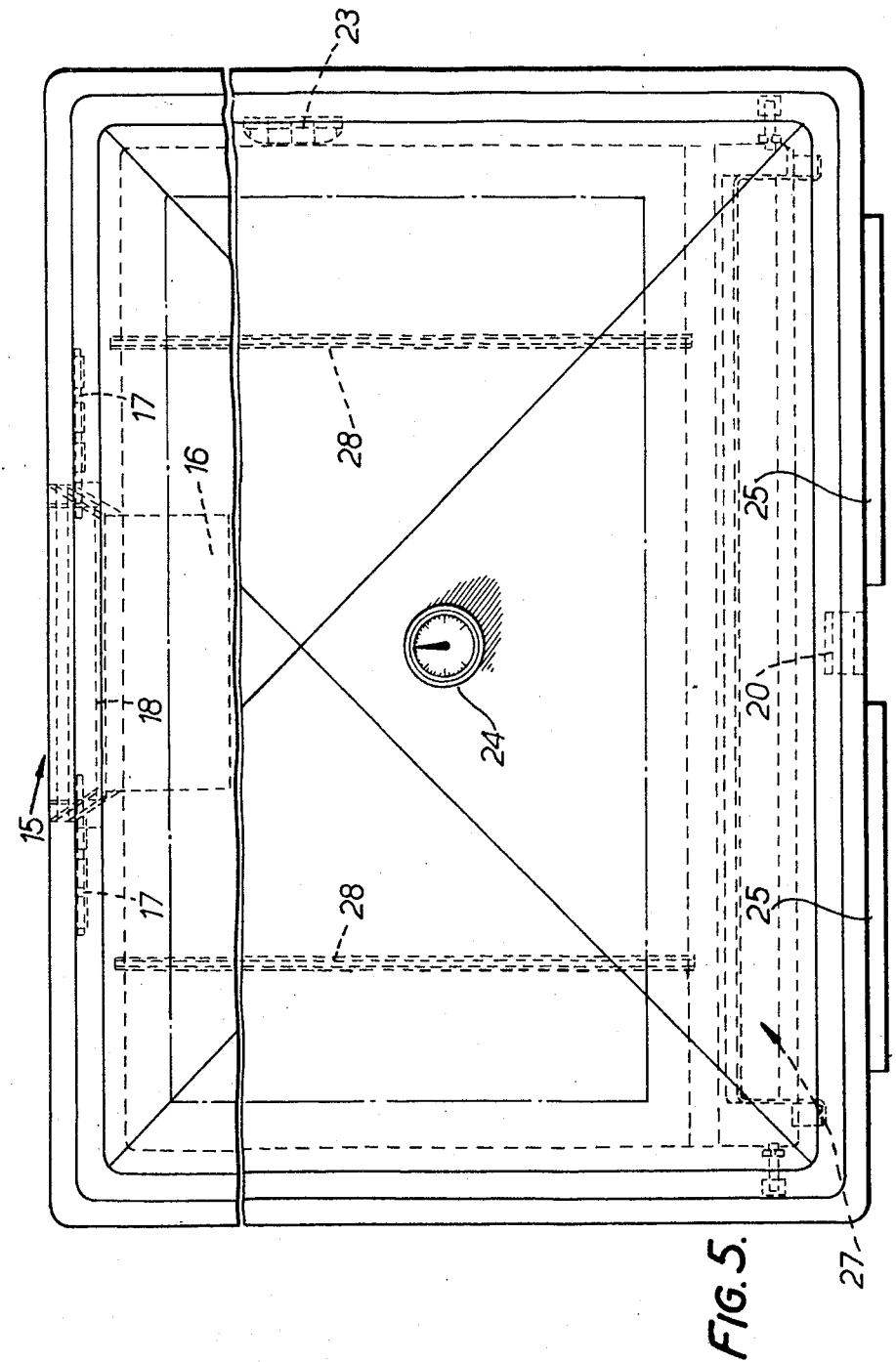
FIG. 5 is a plan view of it.
Figure 6:
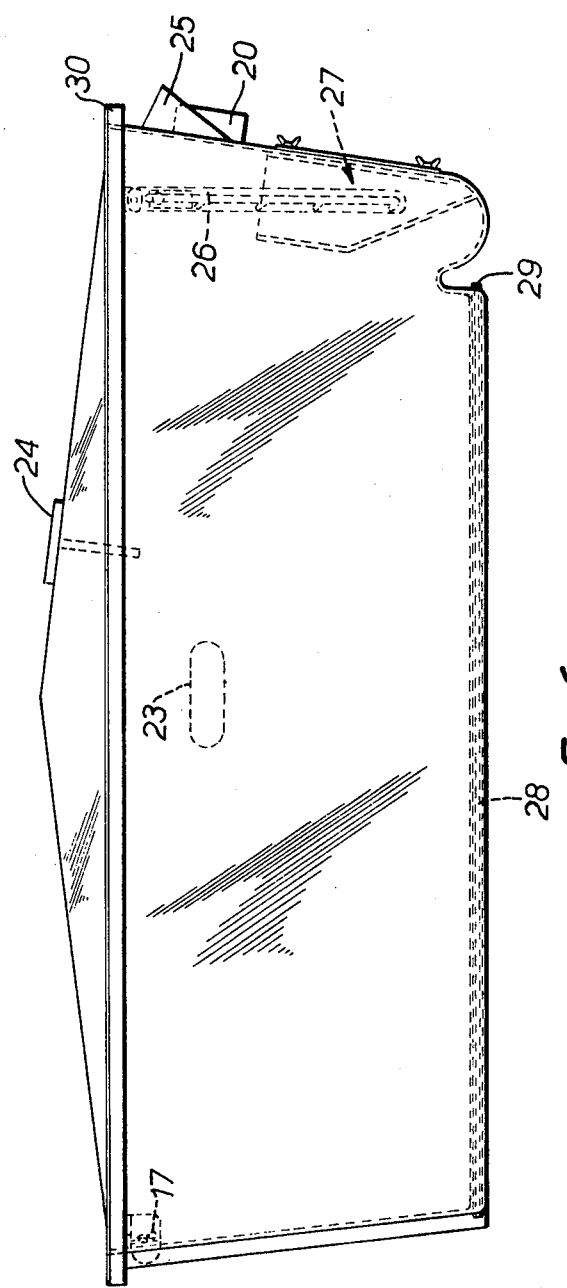
FIG. 6 is a side view of it.
Figure 7:
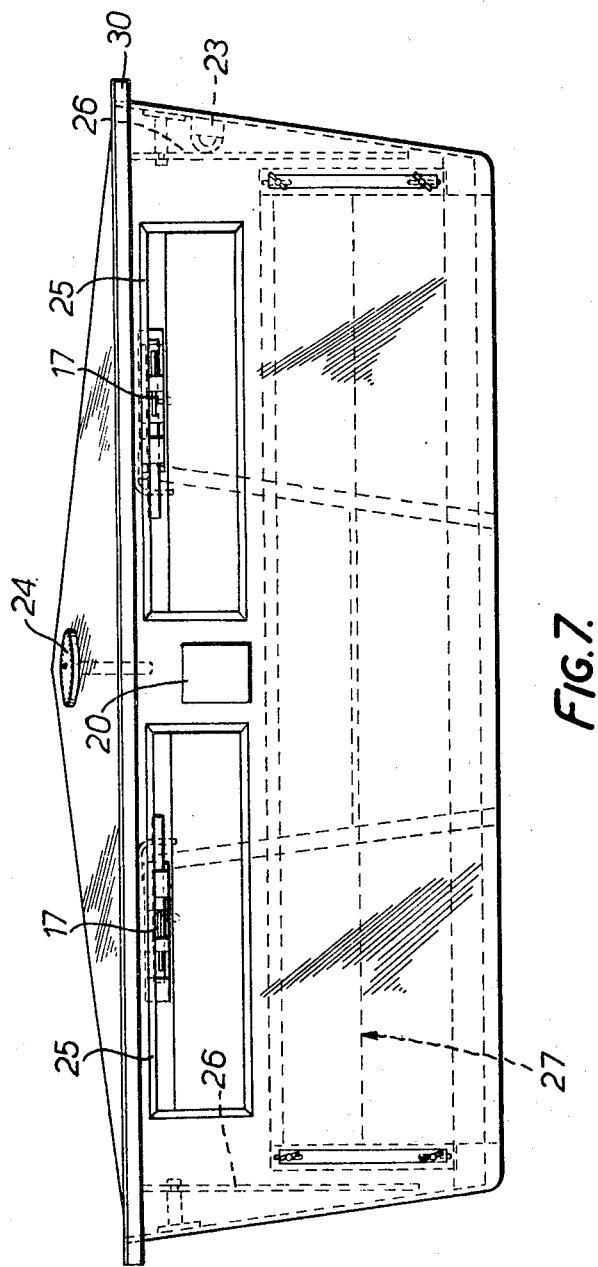
FIG. 7 is a rear view of it.

In the rear half of each pen, i.e. remote from the passageway 5, there is a respective housing for keeping piglets warm. Each housing is about 6 feet by 7 feet and is about 2 feet 6 inches high, the housings having the positions indicated by broken lines in FIG. 1. Such a housing is shown in FIG. 3 and has side walls 8 and 9, a rear wall 10 and a roof 11, there being an opening at the front (and no door) so that piglets can enter the housing from the front half of the respective pen. The walls 8, 9 and 10 and roof 11 are made from transparent, corrugated plastics sheeting, the corrugations of the roof aiding ventilation. Lying flat on a base 13 of the housing is a panel-shaped heater structure 12 on which piglets can walk, the base 13 being made of rigid, cellular plastics thermally insulating material to reduce the loss of heat into the ground. The structure 12 is not attached to the base, so that it can be readily removed for cleaning the inside of the housing. It is made using aluminium foils (slotted to form electrical conductor patterns) for the electrical heater, the required quantity of foils being connected in series and/or parallel to give the rating and overall size required. The foils are encapsulated in a lamination consisting of an isophthalic, chemical resistant polyester resin gell coat with glass fiber tissue reinforcement, filled by a 16 ounce per square foot thickness lamination of chopped, stranded glass, with polyester resin, all suitably saturated and rolled to exclude all air in the laminate after curing. A further, abrasion resistant coating of isophthalic material is applied to seal exterior surfaces, a cable 14 being brought out at any position or connection as required. A low voltage is used as a safety measure against damage to piglets. Although for clarity of illustration structure 12 is shown of smaller area than the base 13, in practice it will cover substantially all of the base and provide a floor for the housing.

In the front half of each of pens 1 to 4, the floor of the pen may be covered with straw. The interior temperature of each housing is controlled, there being an energy regulator between the cable 14 and a supply.

The housing is designed so that it is collapsible into its component parts for ease of transportation.

Figure 2:
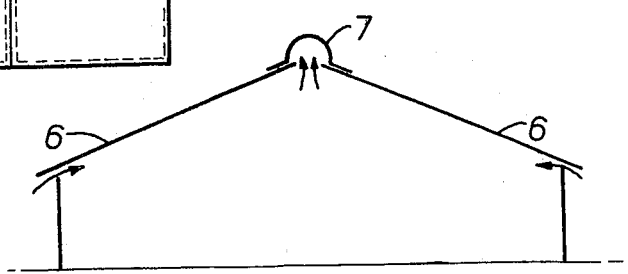
FIG. 2 is a side view of the roof of the house.

Referring to FIGS. 4, 5, 6, 7 and 8, there will now be described an example of a housing according to the invention which could be used in a roofed animal pen, for example in a pen like one of those shown by FIGS. 1 and 2.

The housing comprises a hollow box made of moulded, glass fiber-reinforced plastics material, comprising a rear wall, a front wall, side walls and a floor, and a hinged lid also made of glass fiber-reinforced plastics material. In the front wall there is an entrance opening 15 with an entrance slope 16, the lid is provided with a pair of retaining bolts 17 and the opening 15 has a removable wooden door 18 which can be positioned either to screen the upper half of the opening 15, to increase thermal efficiency, or to screen the lower half of the opening, to retain piglets within the housing. Alternatively, the door 18 may be replaced by a rubber flap, screening the upper half of the opening 15 but allowing piglets to pass underneath. A 350 watt heating element is evenly distributed across substantially the whole of the floor of the housing and is integrally moulded therein to be fully encapsulated and waterproof. Its outline is shown by the line 19. The heating element is controlled by an externally positioned energy regulator coupled in use of the housing to a terminal box 20 from which cables moulded into the housing extend, one of them, shown by broken line 21, serving as a supply cable to the heating element, and the other of them, shown by broken line 22, serving as a supply cable to a bulkhead light 23. This light, as well as serving as a light for inspection purposes, may also provide a "homing" environment for piglets in the housing and it may also be used to assist in regulating feeding times by periodic on/off switching. Mounted in the lid of the housing is a dial type thermometer 24 for monitoring the temperature in the housing. Ventilation is provided by two small ventilators 25 at the back of the housing and can be increased further by raising the lid on adjustable stays 26. Instead of there being three positions in which the lid can be opened, the stays 26 may be such that they allow only one open position of the lid if the ventilators 25 provide enough ventilation. A removable feeding hopper 27 is provided and through the floor of the housing there extend pipes 28 to take water to drinkers outside the front of the housing from a supply at the back of the housing and fed in at points 29 (see FIG. 6). The feeding hopper 27 is also made of glass fiber-reinforced plastics material and the moulded box is formed with a feeding trough 31. On the underside of the lid and on the floor is 1 inch thick rigid polyurethane foam (indicated by 32) for thermal insulation. The upper edges of the box part of the housing are provided with hardwood reinforcement 30.

In plan view, the housing has dimensions of 6 feet 2½ inches by 6 feet 2½ inches and the housing has a maximum height of 2 feet 4½ inches. In use, it may be arranged that a single energy regulator controls up to five housings and the latter may be designed to give an environment of up to 40° F (22° C) above ambient temperature, giving an internal environment of up to 82° F (27° C) assuming an ambient temperature of 42° F (5° C).

Such a housing, as described with reference to FIGS. 4 to 8, may be used to wean piglets at 3 weeks, and has produced a satisfactory weaner weight at 6 weeks.

If it is desired to use such a housing in the open, not in a roofed pen, the insulation 32 may be extended up the inner sides of the walls of the box.

Some advantages which may be achieved using the invention are as follows: no special buildings are required and a housing may be used in an existing roofed animal pen or in the open; housings may be constructed as identical modules; a housing may be made portable and compact so that it can be used in different layouts; a housing may be constructed so that it achieves a uniform and readily controllable distribution of warm air in it; a housing may be constructed in a simple (and therefore reliable) and easily operable form, requiring little supervision; and if, for example, like the housing of FIGS. 4 to 8, a housing may be constructed so that it is quickly and easily cleanable, for example with a power hose.

We claim:

1. A housing adapted for use in weaning piglets, the housing comprising:
   a. a box molded from glass fiber-reinforced plastics material to form in one piece side walls and a floor for the housing, one of said walls of said box defining an opening therethrough so that a piglet can enter or leave the housing, means for at least partially closing said opening;
   b. a lid for the box molded from glass fiber-reinforced plastics material and forming a roof for the housing, said lid being movable to a plurality of positions and in each such position providing an opening to the said box;
   c. means for holding said lid open in each of the said plurality of positions;
   d. means carried by said box for ventilating the housing;
   e. a feeding hopper carried by said box;
   f. a flat electrical heater encapsulated in said floor; and
   g. a duct through said floor for carrying water from one side of the housing to another side.

* * * * *